Oct. 19, 1937.　　　　W. W. GARSTANG　　　　2,096,276
VIBRATOR AND CIRCUIT THEREFOR
Filed May 18, 1936
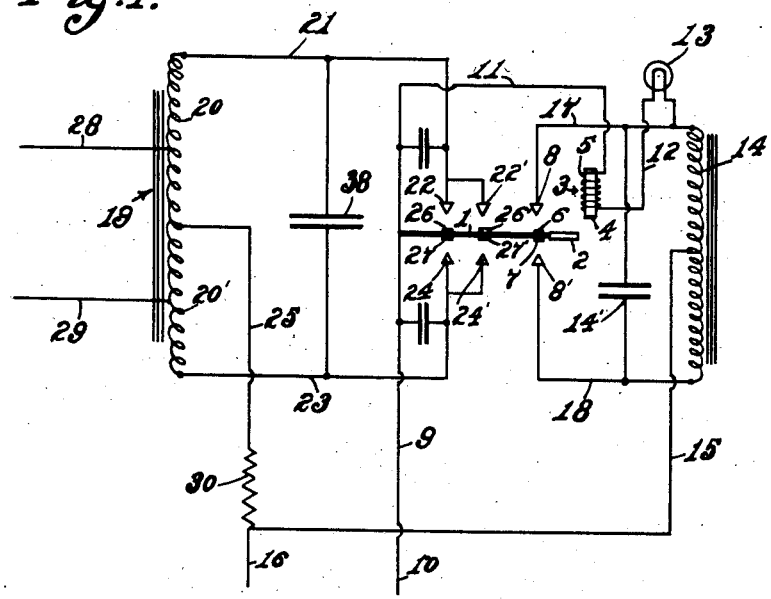
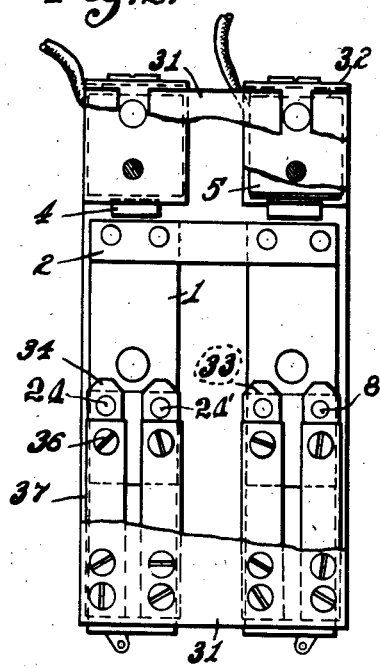
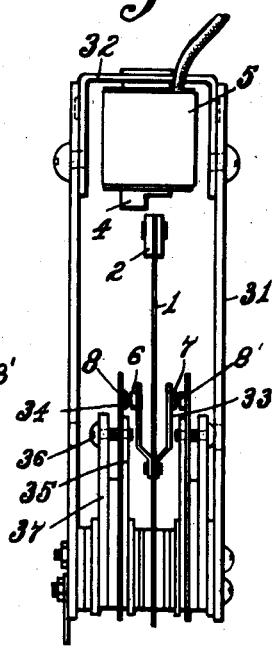
INVENTOR.
William W. Garstang
BY
Hood & Hahn
ATTORNEYS.

Patented Oct. 19, 1937

2,096,276

UNITED STATES PATENT OFFICE 2,096,276

VIBRATOR AND CIRCUIT THEREFOR

William W. Garstang, Indianapolis, Ind.

Application May 18, 1936, Serial No. 80,289

20 Claims. (Cl. 175—373)

My invention relates to improvements in vibrators and the circuit therefor.

My invention is primarily adapted for convertors, power supply units for radios and like instruments.

One of the difficulties heretofore experienced in the present commercial type of vibrator operated power units is the difficulty in maintaining constant the amplitude of the vibrator reed. One reason for this difficulty has been due to the fact that, where the vibrator magnet is connected in the same circuit as the transformer, the imposition of a load on the transformer will result in a modification of the energizing force for the vibrator reed to such an extent that the amplitude of movement of the reed is considerably modified, not only resulting sometimes in the failure of the vibrator to start, but also resulting in an erratic oscillation of the reed thereof. This, in turn, will affect the output of the device.

As the result, however, of my invention, I am enabled to maintain constant the amplitude of the vibrating reed and maintain this vibrating reed in tune with the circuit of the energizing magnet of the vibrator.

For the purpose of disclosing my invention, I have illustrated an embodiment thereof in the accompanying drawing, in which:

Fig. 1 is a diagrammatic view of a circuit arrangement embodying my invention;

Fig. 2 is a side elevation of a vibrator embodying my invention; and

Fig. 3 is an end elevation thereof.

In the embodiment illustrated, the vibrator reed 1 having an armature 2 at the end thereof, is operated by the electromagnet 3, the core 4 of which is adapted to influence the armature 2, and this electromagnet is provided with a coil 5. The reed 2 is provided with contacts 6 and 7 adapted to respectively engage relatively stationary contacts 8 and 8'. This set of contacts is arranged for the purpose of controlling the vibrator circuit. To this end, the reed 1 is connected by a conductor 9 with one side 10 of the power supply circuit. One terminal of the winding 5 is connected by the conductor 11 with the conductor 9 and the opposite terminal of the winding is connected by a conductor 12 through a resistance 13 with one terminal of an iron core inductance 14. The resistance 13, if desired, may be in the form of a lamp. Intermediate of its ends, the winding of the inductance 14 is connected by a conductor 15 with the opposite side 16 of the power supply line. The contact 8 is likewise connected to one terminal of the inductance 14 by a conductor 17 and the contact 8' is connected by a conductor 18, with the opposite end of the inductance 14. A suitable condenser may be connected across the conductors 17 and 18 and, therefore, across the ends of the inductance.

In operation, as soon as the circuit is closed through the conductor 9, a circuit will be established including the coil 5 of the electromagnet, the resistance 13 and one section of the winding of the inductance 14, thence by conductor 15 to the opposite side of the line. This immediately energizes the vibrator magnet causing the armature 2 to be attracted towards the core 4, thereby engaging contacts 6 and 8 which establishes a short circuit for the electromagnet circuit by the way of conductor 17. It will be noted that at this time, not only is the winding 5 shorted but also the resistance 13. As soon as the winding 5 is short circuited, the reed 1 will cause the armature 2 to move in the opposite direction, and due to its amplitude of movement, the contacts 7 and 8' will be closed, establishing a circuit through the other section of the winding of the inductance 14. The reed, of course, will continue to vibrate so long as current is passed through the winding 5. Due to the fact that while the coil 5 is short-circuited, upon the energization of the electromagnet the inductance 14 still remains in the circuit, there is no dead short established across the line upon the shorting of the electromagnet. Furthermore, due to the fact that the vibrator reed swings to engage contacts 7 and 8', upon the shorting of the coil 5, current passes through the opposite section of the inductance 14. As a result, an increased voltage is impressed upon the winding or coil 5, thereby tending to amplify the motion of the armature 2 towards the magnet and accordingly amplify the movement of the reed 1. As a result of this action, there is no damaging effect upon the reed and the amplitude of movement of the reed is maintained constant.

The vibrator and circuit thus disclosed is adapted to control a circuit particularly of the type illustrated in the drawing. This circuit includes a transformer 19 which may be of the auto-transformer-type, illustrated, or may be of the static type. In this transformer, the primary winding 20 has one end connected by the conductor 21 with a contact 22 and the opposite end connected by a conductor 23 with a contact 24.

The intermediate portion of the primary winding is connected by a conductor 25 with one side 16 of the power supply line. Suitable contacts 26 and 27 adapted to engage respectively the contacts 22 and 24 are mounted on the reed. Additional contacts 26' and 27' on the reed are provided to engage contacts 22' and 24' in parallel respectively with contacts 22 and 24 to thus increase the contact and without increasing the size of the individual contacts. If desired, condensers may be connected between the conductor 9 and the contact 24 and the conductor 9 and the contact 22 as well as between conductors 21 and 23.

Suitable power takeoffs 28 and 29 are connected to the auto-transformer windings. The operation is quite obvious. With the reed set in vibratory movement, as soon as contacts 26 and 22 are engaged, a circuit will be established from the conductor 9, the reed 1, contacts 26 and 22, and thence by conductor 21 through one winding 20 of the transformer and thence by conductor 25 through the resistance 30 back to the opposite side of the line. As soon as the reed 1 vibrates in the opposite direction, circuit will be established from the conductor 9 through contacts 27 and 24 through the other winding 20' and thence by conductor 25 through the resistance 30 back to the opposite side of the line.

As a result of the above-described circuit arrangement, I am enabled to provide what may be termed as a driving circuit for the vibrator, which driving circuit will be entirely unaffected by any modifications of the controlled circuit, the auto-transformer circuit being designated as the controlled circuit. It frequently happens that in a vibrator type converter, where the transformer forms a part of the driving circuit of the energizing magnet of the vibrator, a change in characteristic of the load imposed upon the transformer will materially affect the energizing current of the electromagnet to such an extent that an erratic operation of the vibrator results. This, in turn, materially affects the character of the output of the transformer. Not only is the character of the output of the transformer affected but the amplitude of movement of the reed is affected to such an extent that it further modifies the characteristics of the circuit and the error builds up.

Furthermore, it frequently happens that the imposition of a load upon the transformer will so modify the characteristics of the circuit of the energizing magnet of the vibrator that the vibrator will not properly start. By the construction disclosed in the above circuit, the driving circuit for the electromagnet may be made independent of the transformer circuit and therefore no change in characteristics of the transformer circuit will affect the driving circuit of the vibrator. As a result, the wave form of the alternating current output of the transformer is more stable and is more uniform.

Furthermore, necessary corrections may be made on this wave form without affecting in any way the operation of the vibrator, insuring a more uniform result of the device as a whole over wider range of load characteristics. Also, it is to be noted that, as a result of the construction illustrated, heavier loads may be carried by the same sized vibrator and without increasing the size of the contacts of the vibrator.

While I have illustrated a center tap inductance of the iron core type as being used in the driving circuit, and I have found from experience that in certain instances, this is the most satisfactory type of inductance for use, it will be obvious that an inductance without the center tap might be used efficiently by omitting contact 8' and its associated connections.

In Figs. 2 and 3, I have illustrated a type of electromagnet which may be used in the circuit above described. In this structure, I provide a base 31 having an overhanging arm 32 on which is mounted the core 4 surrounded by the winding 5. At the opposite end of this base 31 is mounted one end of the vibrating reed 1. This reed may carry and operate a plurality of contacts, not only the contacts 6 and 7 and contacts 26 and 27 but auxiliary contacts, if desired. The contacts carried by the reed, as shown as contacts 6 and 7, are mounted on small spring arms as at 33 secured to the reed proper which, it will be noted, is anchored at its bottom end. The stationary contacts, such as the contacts 8 and 8', are adapted to be mounted on spring fingers 34, anchored at their bottom ends and in their normal position adapted to rest on stationary arms 35 which, however, are adjustable, at their upper end, through means of the set-screw 36 operating in the end of an arm 37, whereby the gap between the stationary contacts and the vibrator carried contacts may be very nicely adjusted.

In the structure illustrated, I have illustrated the operating magnet as being in the form of two sets of coils with two cores. In actual practice, however, these two coils and cores act as one and if desired, the magnet could be incorporated in one structure. Also, I have illustrated the reed 1 as being formed of two reed sections connecting together at their free ends by the armature 2. In actual practice, this reed may be formed of a single piece of material, if desired.

The condenser or capacitor 38 which is connected between conductors 21 and 23 and, therefore, across the winding of the transformer, may be varied for phase correction and the value of this capacitor is dependent upon the power factor of the load operated by the transformer.

The condenser or capacitor 38 may be of different values in accordance with the frequency of the vibration of the reed. In other words, this capacitor is for the purpose of tuning the circuit of the winding 5 to the frequency of the vibrator reed so that the electromagnet circuit may be in absolute tune with the frequency of the vibrator reed thus maintaining the amplitude of the reed constant under operating conditions.

I claim as my invention:

1. In a device of the character described, the combination with a vibrating reed and an electromagnet for vibrating said reed, of an energizing circuit for said magnet, including a pair of normally open contacts operated by said reed for alternately closing and opening said magnet circuit, an inductance in said energizing circuit, so disposed in said circuit as to be unaffected by the current of the load circuit, and a load circuit controlled by the vibrations of said reed and independent of said inductance.

2. The combination with a load circuit, of a vibrator for controlling said circuit, including a vibrating reed and an electromagnet for vibrating said reed, an operating circuit for said electromagnet, independent of said load circuit, including said reed and at least a portion of an inductance, a contact adapted to be closed by the operation of said reed and establish a short circuit for said electromagnet, including said portion of said inductance, and a second contact adapted to be closed by said reed upon the opening of said first contact and adapted when closed to establish a circuit including a second portion of said inductance, said inductance being so disposed in the operating circuit as to be unaffected by the current of the load circuit.

3. The combination with a load circuit, of a vibrating reed switch for controlling said circuit, an electromagnet for operating said reed switch, a circuit for said electromagnet independent of said load circuit, including a contact, the windings of said electromagnet, a resistance and a portion of an inductance, a contact on said reed for engaging said first-mentioned contact upon the energization of said magnet adapted to close a short circuit around the windings of said electromagnet and said resistance, and a second circuit including a contact and another portion of said inductance, and a contact on said reed adapted, upon engagement of said second contact, to establish a circuit through said second portion of said inductance, said inductance being so disposed in said second circuit as to be unaffected by the current of the load circuit.

4. The combination with a load circuit, of a vibrating reed switch for controlling said circuit, an electromagnet for operating said reed, an inductance independent of said load circuit and unaffected by the current of said load circuit, a pair of contacts adapted to be alternately engaged by contacts on said reed for alternately closing the circuit through said inductance in opposite directions, and an operating circuit for said electromagnet adapted to be short-circuited by the movement of said reed under the influence of said electromagnet.

5. The combination with a load circuit, of a vibrating reed switch for controlling said circuit, a driving circuit for said vibrating reed independent of said load circuit, comprising an energizing circuit for the winding of said electromagnet including a resistance and a portion of an inductance, a short circuit for said electromagnet and resistance including a contact adapted to be engaged by said reed when the electromagnet is energized and said portions of said inductance and a second circuit including a contact adapted to be engaged by said reed when the electromagnet is short-circuited and another portion of said inductance, said inductance being so disposed in the driving circuit to be unaffected by the current of the load circuit.

6. The combination with a load circuit, of a vibrating reed switch for controlling said load circuit, a driving circuit for said vibrating reed switch independent of said load circuit and comprising an inductance connected intermediate of its ends to one side of the line, the vibrating reed connected to the opposite side of a supply line, the electromagnetic windings having one terminal connected to said opposite side of the line, a pair of contacts, one connected to one end of said inductance, and the other connected to the opposite end of said inductance and adapted to be alternately engaged by the reed in its vibration, and a capacitance connected across the ends of said inductance, said inductance being so disposed in the driving circuit to be unaffected by the current of the load circuit.

7. The combination with a transformer connected intermediate of its ends to one side of a line, of a vibrating switch including a reed connected to the opposite side of a supply line, and a pair of contacts adapted to be alternately engaged by the vibration of said reed and connected to the opposite ends of the primary of said transformer, and a driving circuit independent of said transformer circuit comprising an electromagnet winding having one terminal connected to one side of the line and its opposite side connected to one end of an inductance, said inductance being connected intermediate of its ends with the opposite side of the line, a pair of contacts adapted to be alternately engaged by said reed in its vibration, one being connected to one end of said inductance and the other being connected to the opposite end of said inductance, said inductance being so disposed in the driving circuit as to be unaffected by the current of the transformer.

8. The combination with a load circuit, of a vibrator for controlling said circuit, including a vibrating reed and an electromagnet for vibrating said reed, an operating circuit for said electromagnet independent of said load circuit, and means in said operating circuit for limiting the current flow through the energizing winding of said electromagnet and so disposed in said operating circuit as to be unaffected by the current of the load circuit.

9. The combination with a load circuit, of a vibrating reed switch for controlling said circuit, including an electromagnet for operating the reed of said switch and a driving circuit for said electromagnet, independent of said load circuit and including an iron core inductance so disposed in the driving circuit as to be unaffected by the current of the load circuit.

10. The combination with a load circuit including a transformer, of a vibrating reed switch for alternately closing the circuit through the primary winding of said transformer in opposite directions, an electromagnet for operating the vibrating reed of said switch, and a driving circuit for said electromagnet, independent of said load circuit and including an iron core inductance so disposed in the driving circuit as to be unaffected by the current of the load circuit.

11. The combination with a load circuit including a transformer, of a vibrating reed switch for alternately closing the circuit in opposite directions through the primary windings of said transformer, an electromagnet for operating the reed of said switch, and a driving circuit independent of said transformer circuit including an iron core inductance so disposed in the driving circuit as to be unaffected by the current of the load circuit and contacts for repeatedly interrupting the circuit through said electromagnet and controlling the current through said inductance.

12. The combination with a load circuit, of a vibrator for controlling said circuit, including a vibrating reed and an electromagnet for vibrating said reed, an operating circuit for said electromagnet, independent of said load circuit, and an inductance in the winding circuit of said electromagnet and so disposed in said circuit to be unaffected by the current of the load circuit.

13. The combination with a load circuit, of a vibrator for controlling said circuit, including a vibrating reed and an electromagnet for vibrating said reed, an operating circuit for said electromagnet, independent of said load circuit, an inductance in said operating circuit and so disposed in said circuit as to be unaffected by the current of the load circuit and a capacitance connected across the terminals of said inductance.

14. The combination with a load circuit, of a vibrator for controlling said circuit, including a vibrating reed and an electromagnet for vibrating said reed, an operating circuit for said electromagnet, independent of said load circuit, including said reed and an inductance, a contact adapted to be closed by the operation of said reed and establish a short circuit for said electromagnet, said inductance being so disposed in the operating circuit as to be unaffected by the current of the load circuit.

15. The combination with a load circuit, of a vibrator for controlling said circuit, including a vibrating reed, an electromagnet for vibrating said reed, an operating circuit for said electromagnet, independent of said load circuit, including said reed and an inductance, a contact adapted to be closed by the operation of said reed and establish a short circuit for said electromagnet including said inductance, and a capacitance connected across the terminals of said inductance, said inductance being so disposed in the operating circuit as to be unaffected by the load circuit.

16. The combination with a load circuit including a transformer, of a vibrating reed switch for alternately closing the circuit through the primary winding of said transformer in opposite directions, an electromagnet for operating the vibrating reed of said switch, and a driving circuit for said electromagnet, independent of said load circuit, an inductance in said driving circuit and so disposed therein as to be unaffected by the current of the load circuit, and a capacitance connected across the terminals of said inductance.

17. The combination with a load circuit, of a vibrating reed switch for controlling said load circuit, a driving circuit for said vibrating reed switch, independent of said load circuit and comprising an inductance connected intermediate of its ends to one side of the line and so disposed in said driving circuit as to be unaffected by the current of the load circuit, the vibrating reed being connected to the opposite side of the line, the electromagnet having one terminal connected to said opposite side of the line, a pair of contacts, one connected to one end of said inductance and the other connected to the opposite end of said inductance and adapted to be alternately engaged by said reed in its vibration.

18. In a direct current transforming system, the combination with an induction coil having a center tapped primary winding, a source of direct current, a pair of spaced contacts connected to the respective ends of said primary winding, a vibrating reed connected with one side of said direct current source and adapted to alternately engage said spaced contacts and being normally out of engagement with either, an electromagnet for vibrating said reed having one terminal connected with said reed and the opposite terminal connected through an inductance with the opposite of said direct current source, a contact connected to one terminal of said inductance and adapted when the reed is moved in one direction under the influence of the energized windings of said electromagnet, to short-circuit said coil.

19. In a direct current transforming system, the combination with an induction coil having a tapped primary winding, a pair of spaced contacts connected with the opposite terminals of said winding, a vibrating reed normally out of engagement with both of said contacts and connected to one side of the source of current and adapted to alternately engage said contacts, an electromagnet winding for operating said reed, having one terminal connected to one side of the source of direct current and the opposite terminal connected through a resistance and an inductance with the opposite side of said source of current, a contact normally spaced from said reed and connected to one terminal of said inductance and adapted when engaged by said reed to short-circuit said winding and resistance.

20. In a direct current transformer, the combination with an induction coil having a center tapped primary winding, of a source of direct current, a vibrating reed connected to one side of said source of direct current, a pair of contacts normally spaced from said reed and respectively connected to the opposite terminals of said primary winding, an electromagnet having one terminal of its energizing winding connected with one side of said source of direct current and adapted to operate said reed, a center tapped inductance having the center tap connected with one side of the source of direct current and one terminal connected to one terminal of said energizing winding, a pair of normally spaced contacts respectively connected to the opposite terminals of said inductance and adapted to be alternately engaged by said vibrating reed.

WILLIAM W. GARSTANG.